United States Patent
Striem-Amit (10) Patent No.: US 10,043,010 B1
(45) Date of Patent: Aug. 7, 2018

(54) MIGRATION OF SANDBOX PROCESSES FOR MALWARE PREVENTION

(71) Applicant: CYBEREASON, Boston, MA (US)

(72) Inventor: Yonatan Striem-Amit, Somerville, MA (US)

(73) Assignee: CYBEREASON, Boston, MA (US)

( * ) Notice: Subject to any disclaimer, the term of this patent is extended or adjusted under 35 U.S.C. 154(b) by 0 days.

(21) Appl. No.: 15/395,011

(22) Filed: Dec. 30, 2016

Related U.S. Application Data (60) Provisional application No. 62/273,854, filed on Dec. 31, 2015, provisional application No. 62/273,823, filed on Dec. 31, 2015.

(51) Int. Cl.
| | |
|---|---|
| *G06F 21/56* | (2013.01) |
| *G06F 21/44* | (2013.01) |
| *H04L 29/06* | (2006.01) |
| *G06F 9/48* | (2006.01) |
| *G06F 21/53* | (2013.01) |

(52) U.S. Cl.
CPC .......... *G06F 21/566* (2013.01); *G06F 9/4856* (2013.01); *G06F 21/44* (2013.01); *H04L 63/10* (2013.01); *G06F 21/53* (2013.01); *G06F 2221/033* (2013.01)

(58) Field of Classification Search
CPC ...... G06F 21/566; G06F 21/44; G06F 9/4856; G06F 21/53; G06F 2221/033; H04L 63/10
See application file for complete search history.

(56) References Cited

U.S. PATENT DOCUMENTS

| | | | |
|---|---|---|---|
| 8,813,240 B1 * | 8/2014 | Northup | G06F 21/554 726/22 |
| 2007/0214505 A1 * | 9/2007 | Stavrou | G06F 21/55 726/24 |
| 2012/0017213 A1 * | 1/2012 | Hunt | G06F 21/53 718/100 |
| 2015/0278513 A1 * | 10/2015 | Krasin, IV | G06F 9/5005 726/30 |
| 2016/0306658 A1 * | 10/2016 | Serebrin | G06F 3/0619 |

* cited by examiner

*Primary Examiner* — Matthew Smithers (74) *Attorney, Agent, or Firm* — Brake Hughes Bellermann LLP (57) ABSTRACT

Techniques of protecting computers from malware involve migrating processes running applications from a first sandbox to a second sandbox. Along these lines, when a computer being protected from malware receives application code over a network, the computer generates a set of processes that runs the application code on a first machine acting as a sandbox. After the set of processes produce a first output on the first machine, the computer migrates the set of processes to a second machine acting as another sandbox. After the set of processes produces a second output on the second machine, the computer grants or denies access to the application code based the second output. Because migration can occur over the entire lifecycle of an application and migration is difficult to detect, migrating processes running malware makes it more difficult for the malware to evade detection.

17 Claims, 5 Drawing Sheets

MIGRATION OF SANDBOX PROCESSES FOR MALWARE PREVENTION

CROSS REFERENCE TO RELATED APPLICATION

This application is a Non-Provisional of, and claims priority to, U.S. Patent Application No. 62/273,854, filed on Dec. 31, 2015, entitled "DISTRIBUTED SANDBOX", and No. 62/273,823, filed on Dec. 31, 2015, entitled "MIGRATING SANDBOXES," the contents of which are incorporated by reference herein in their entirety.

TECHNICAL FIELD

This description relates to preventing malware from running on computers.

BACKGROUND

Sandboxing is a computer security technique used to prevent unauthorized access of computational resources and/or malicious attacks. Sandboxing involves running new applications in a computing environment, or sandbox, isolated from other computing environments that may be vulnerable to such malicious attacks. Because computers typically experience malicious effects produced by most malware applications at the beginning of runtime, such a sandbox can help determine whether or not a new application contains any malware.

SUMMARY

In one general aspect, a method of protecting computers from malicious applications includes receiving, by processing circuitry of a computer, application code that includes a set of instructions, the set of instructions, when executed by the computer on a first electronic machine, generating a set of processes on the first electronic machine that causes the first electronic machine to produce a first output. The method also includes executing the set of instructions on the first electronic machine. The method further includes performing a migration operation to migrate the set of processes on the first electronic machine to a second electronic machine distinct from the first electronic machine, the set of processes causing the second electronic machine to produce a second output. The method further includes performing a comparison operation on the first output and the second output to produce a comparison result. The method further includes granting or denying the application code access to the computer based on the comparison result.

The details of one or more implementations are set forth in the accompanying drawings and the description below. Other features will be apparent from the description and drawings, and from the claims.

DETAILED DESCRIPTION

As defined in this disclosure an output of an application is anything returned by the application or any measurable side effects of such things returned by the application.

Further, as defined in this disclosure a migration operation includes either migrating a process (which in turn includes moving a process to an electronic or virtual machine and killing the original process) or of duplicating a process and allowing the original process to continue running.

Conventional sandboxing techniques monitors applications at the beginning of their run cycles. Accordingly, some malicious applications may evade detection by suppressing malware effects until some event occurs. In one example, a malicious application may suppress its malware effects until after a certain amount of time has passed. In another example, the malicious application may begin the malware effects in response to a human-initiated event such as a mouse click.

In contrast to the above-described conventional sandboxing techniques in which malicious applications can evade detection, improved techniques involve migrating processes running applications from a first sandbox to a second sandbox. Along these lines, when a computer that is being protected from malware receives application code over a network, the computer generates a set of processes that runs the application code on a first machine acting as a sandbox. After the set of processes produce a first output on the first machine, the computer migrates the set of processes to a second machine acting as another sandbox. After the set of processes produces a second output on the second machine, the computer grants or denies access to the application code based on the second output. Because migration can occur over the entire lifecycle of an application and migration is difficult to detect, migrating processes running a malicious application advantageously makes it more difficult for the malicious application to evade detection.

In some arrangements, a process can be migrated to a sandbox from an environment within the computer at any moment during the runtime of the process. After migration, the process can be subjected to extensive analysis and study to detect whether it is malicious.

Figure 1:
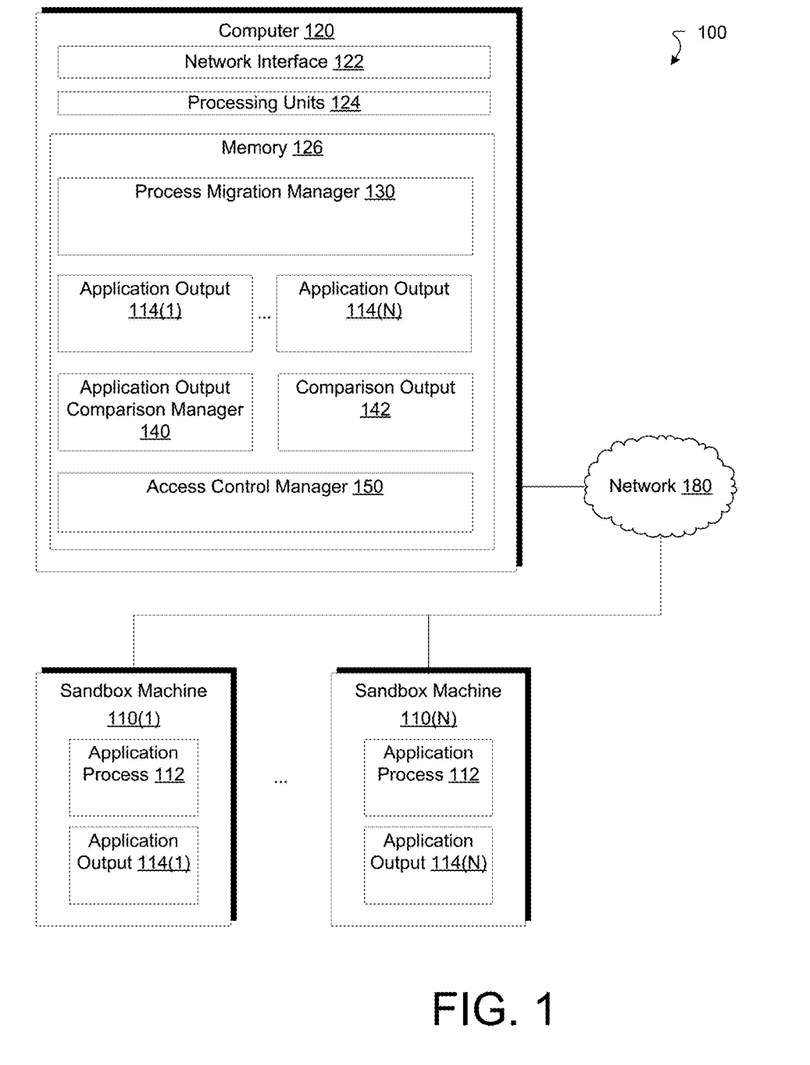
FIG. 1 is a diagram that illustrates an example electronic environment according to an implementation of improved techniques described herein.

FIG. 1 is a diagram that illustrates an example electronic environment 100 in which the above-described improved techniques may be implemented. As shown, in FIG. 1, the example electronic environment 100 includes sandbox machines 110(1), . . . , 110(N), a computer 120, and a network 180.

Each of the sandbox machines 110(1), . . . , 110(N), e.g., sandbox machine 110(1), is configured to run application process 112 generated by the computer 120. For example, suppose that the computer 120 receives javascript code as part of an email attachment. The computer 120 may then generate the application process 112 from the javascript code on the sandbox machine 110(1) by running the javascript code in a browser running on the sandbox machine 110(1).

Each of the sandbox machines 110(1), . . . , 110(N), e.g., sandbox machine 110(1), is also configured to produce an application output 114(1) as a result of running the application process 112. For example, suppose that, in the above example, the javascript code, when interpreted by the browser of the sandbox machine 110(1), runs a survey application. The output of such an application may be a single file that includes survey results input by a user. In some arrangements, nevertheless, the output of the survey application may be the generation and/or alteration of many files on disk. In such a case, the application may be acting as malware.

As illustrated in FIG. 1, each of the sandbox machines 110(1), . . . , 110(N) is a machine separate from the computer 120 and connected to the computer 120 over the network 180. In some arrangements, at least one of the sandbox machines 110(1), . . . , 110(N), e.g., sandbox machine 110(1) is a virtual machine configured to emulate the computer 120. In some arrangements, at least one of the sandbox machines 110(1), . . . , 110(N), e.g., sandbox machine 110(1) is contained within the computer 120.

The computer 120 is configured to detect and prevent malware. The computer 120 includes a network interface 122, one or more processing units 124, and memory 126. The network interface 122 includes, for example, Ethernet adaptors, Token Ring adaptors, and the like, for converting electronic and/or optical signals received from the network 180 to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a process migration manager 130, an application output comparison manager 140, and an access control manager 150. Further, as illustrated in FIG. 1, the memory 126 is configured to store various data, which is described with respect to the respective managers that use such data.

The process migration manager 120 is configured to migrate the application process 112 from a first machine, e.g., sandbox machine 110(1) to a second sandbox machine, e.g., sandbox machine 110(N). Process migration is a technique in which a running process is moved from one machine to another. For example, the MOSIX operating system migrates processes between machines in order to ensure load-balancing and improved performance. It is worthwhile noting that MOSIX2 can run as a virtual machine (VM) over various operating systems including Windows. Migration is useful since migration can be made hard for a running process to detect.

In some arrangements, the process migration manager 130 is configured to migrate the application process 112 in response to some specified event. For example, such an event may be the passage of a specified amount of time. The event may occur with a specified probability distribution over time. In other arrangements, the event may be related to an activity level of the application process on the machine 110(1). Further details relating to the process migration manager 120 are provided with respect to FIG. 3 below.

In some arrangements, migration or cloning can be done with more than one application. For instance, if it is suspected that interactions of two programs have undesired behavior, pairs of programs can be migrated or cloned into the sandbox. Note that currently, if the attack requires two (or more) programs to come to fruition and the programs enter the system at different times, the current sandbox without cloning will not be able to detect the malicious activity. The ability to look for interactions between multiple applications is novel and has important implications for many uses.

A result of running the application process 112 on the machine 110(1) is an application output 114(1). One example of such an application output 114(1) may be a measure of an activity level of the process 112 as it runs on the sandbox machine 110(1). One aspect of the activity level may be a number of files created and/or deleted. Another aspect of the activity level may be a rate of memory access. In this case, the memory can be any type of volatile memory (e.g., RAM, cache memory) or non-volatile memory (e.g., magnetic disk, solid-state disk, non-volatile RAM).

The computer 120 as illustrated in FIG. 1 is configured to acquire and store application output 114(1), . . . , 114(N) from each respective sandbox machine 110(1), . . . , 110(N). Each application output 114(1), . . . , 114(N), e.g., application output 114(1), may take the form of a text or binary file containing a value of a specified output, e.g., a value of an activity level of the application process 112(1) running on the sandbox machine 110(1).

In some arrangements, the application output comparison manager 140 is configured to compare the various application outputs 114(1), . . . , 114(N) to each other in order to produce, as the output, a comparison output 142 that is a basis for whether the computer 120 grants or denies the application code access to the computer 120. For example, when the various application outputs 114(1), . . . , 114(N) include values of activity levels, the comparison output 142 may take the form of a difference between the maximum value and the minimum value.

Alternatively, the application output comparison manager 140 can be configured to detect known malicious activity. Such malicious activity is well studied in the art and can include buffer overflows, out of memory access, resource utilization, disk access, access to protected files, access to honeypot files, rate limitations, connection to suspicious IP addresses, and the like.

The access control manager 150 is configured to grant or deny the application code access to the computer 120 based on the output 142. By granting or denying the application code access, the computer 120 decides whether or not it will run application processes generated by instructions included in the application code by the processing units 124. For example, a known technique of evading malware detection by a single sandbox machine is to sleep for a defined period of time and/or to detect mouse movements before executing. (The mouse movements indicate that a human rather than a sandbox is operating the computer 120.) Thus, an application process 112 that outputs a low measure of activity 114(1) on the first sandbox machine 110(1) and then a high measure of activity 114(N) on the second sandbox machine 110(N) will produce as the output 142 either the large value 114(N) or, in some arrangements, a large differential value between the low and high values 114(1) and 114(N). Such a large value or differential value as the output 142 may indicate a high risk of the application code containing malware. In this case, the access control manager 150 may deny the application code access to the computer 120.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the process migration manager 130 (and/or a portion thereof), the application output comparison manager 140 (and/or a portion thereof), and the access control manager 170 (and/or a portion thereof) can be a combination of a processor and a memory configured to execute instructions related to a process to implement one or more functions.

Figure 2:
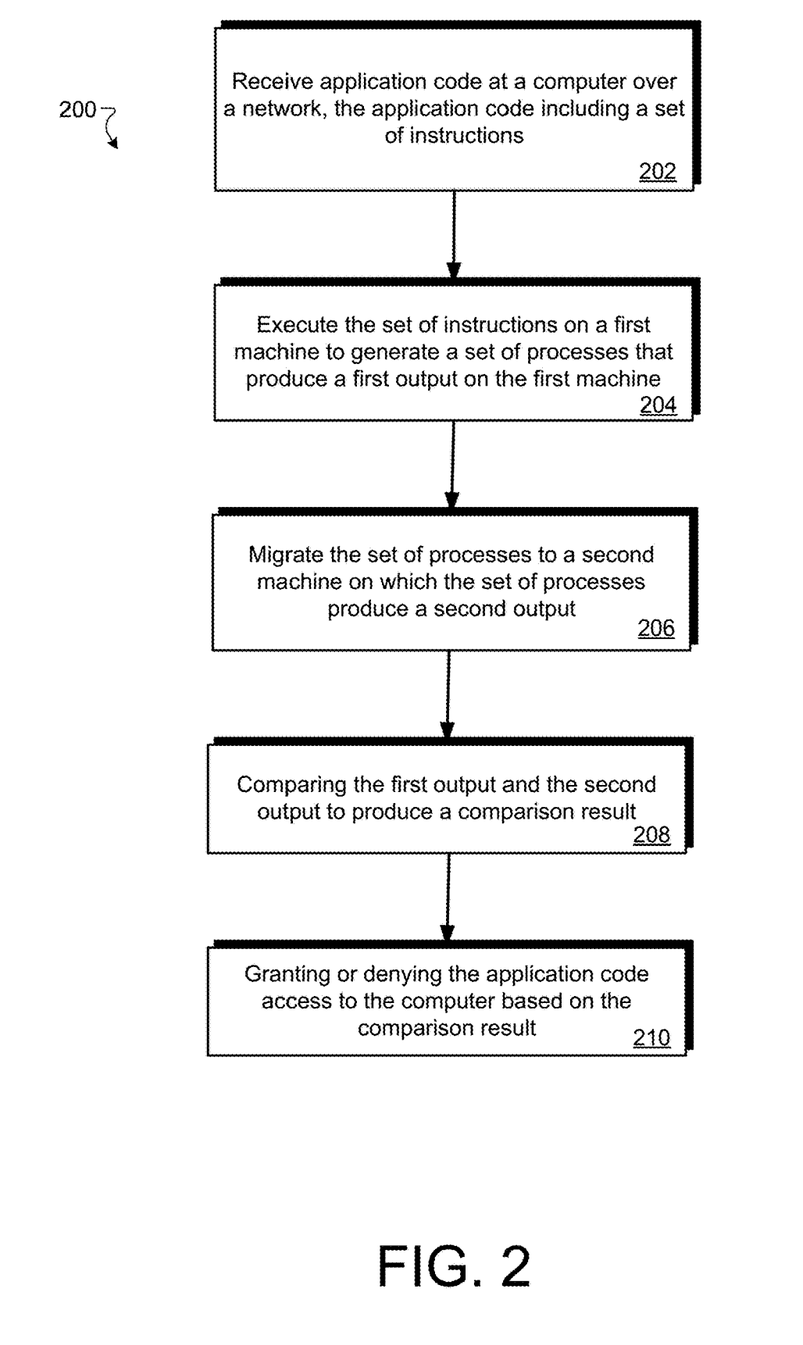
FIG. 2 is a diagram that illustrates an example method according to the improved techniques described herein.

FIG. 2 is a flow chart that illustrates an example method 200 of protecting computers from malicious applications. The method 200 may be performed by software constructs described in connection with FIG. 1, which reside in memory 126 of the computer 120 and are run by the set of processing units 124.

At 202, the computer 120 receives application code that includes a set of instructions. The set of instructions, when executed by the computer on a first electronic machine, generates a set of processes, e.g., application process 112, on the first electronic machine that causes the first electronic machine, e.g., sandbox machine 110(1), to produce a first output, e.g., the application output 114(1). In some arrangements, the first electronic machine is a virtual machine emulating the computer 120.

At 204, the computer 120 executes the set of instructions on the first electronic machine, i.e., the sandbox machine 110(1). In this execution, the computer 120 generates the application process 112 on the sandbox machine 110(1).

At 206, the computer 120 performs a migration operation to migrate the set of processes on the first electronic machine to a second electronic machine, e.g., sandbox machine 110(N), distinct from the first electronic machine. The set of processes, e.g., application process 112, causes the second electronic machine 114(N) to produce a second output, i.e., the application output 114(N).

At 208, the computer 120 grants or denies the application code access to the computer based on the application output 114(N). For example, if the application output 114(N) indicates a high activity level, then the access control manager 150 may deny access to the application code. If the application output 114(N) indicates a low activity level, then the access control manager 150 may grant access to the application code.

In some arrangements, the computer 120 performs a comparison operation on the first output and the second output to produce a comparison result 152. It is implied here that the computer 120 acquires the application outputs 114(1), . . . , 114(N) by some push or pull method. Again, the comparison operation may involve producing a difference between a maximum value and a minimum value of an activity level of the application process on the sandbox machines 110(1), . . . , 110(N). If the comparison result 152 involves a large differential in activity level of the application process 112, then the access control manager 150 may deny access to the application code. If the comparison result 152 involves a small or zero differential in activity level of the application process 112, then the access control manager 150 may grant access to the application code.

Figure 3:
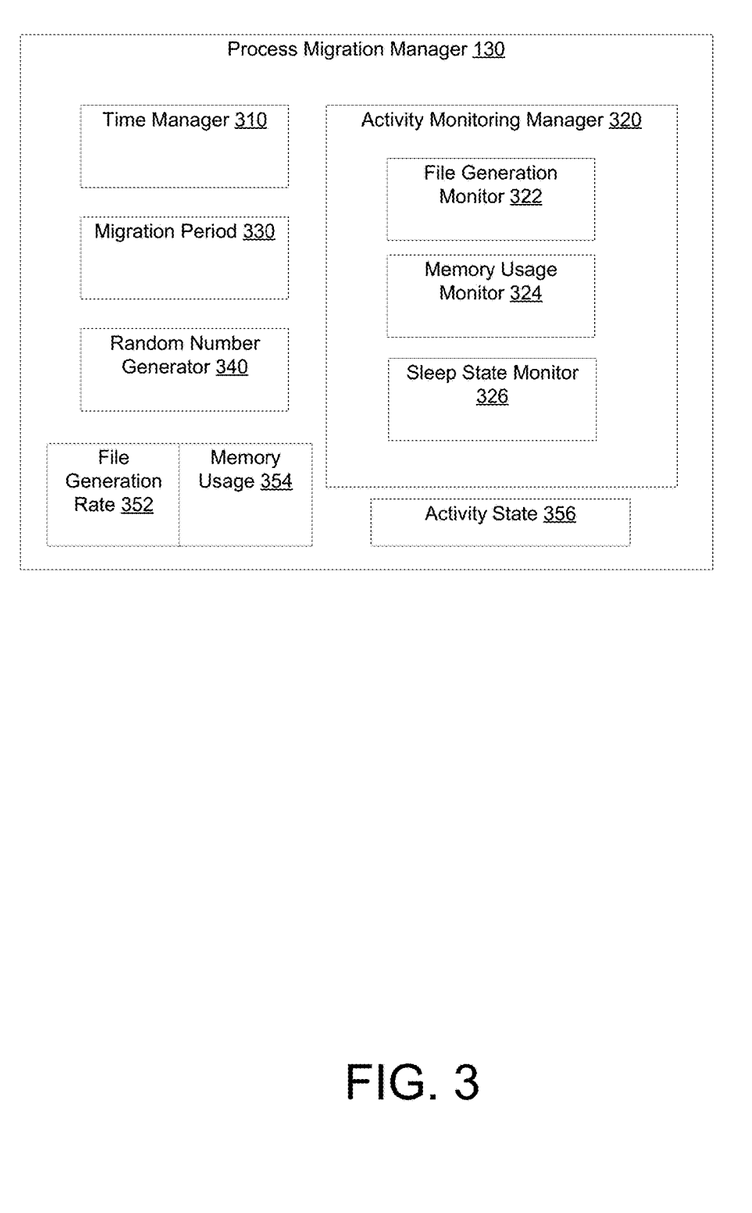
FIG. 3 is a diagram that illustrates an example migration manager according to the improved techniques described herein.

FIG. 3 is a diagram illustrating further detail concerning the example process migration manager 130. As illustrated in FIG. 3, the example process migration manager 130 includes a time manager 310, an activity monitoring manager 320, and a random number generator 340.

The time manager 310 is configured to track a time elapsed since the computer 120 generates the process 112 to run on the first sandbox machine 110(1). In some arrangements, the process migration manager 130 compares the current time tracked by the time manager to a migration period 330. In some further arrangements, if the time tracked by the time manager 310 exceeds the migration period 330, then the process migration manager 130 may initiate a migration operation on the application process 112.

In some arrangements, it is desirable to perform the migration operation at random intervals. For example, at each time interval given by the migration period 330, the process migration manager 130 performs the migration operation with a specified probability. For example, to effect such a migration schedule, the process migration manager 130 may use a random number generator 340 which generates a random number between 0 and 1. Along these lines, if the specified probability is p, then the process migration manager 130 performs the migration operation when the random number generator 340 outputs a number less than p, and does not perform the migration operation when the random number generator 340 outputs a number greater than p.

The activity monitoring manager 320 is configured to monitor various process activity parameters as the application process 112 runs on any of the sandbox machines 110(1), . . . , 110(N). The activity monitoring manager 320 includes a file generation monitor 322, a memory usage monitor 324, and a sleep state monitor 326. The process monitoring manager 130 may initiate the migration operation based on the outputs of these monitors.

The file generation monitor 322 is configured to monitor a number of files created during the running of the application process 112 on any of the sandbox machines 110(1), . . . , 110(N). In some arrangements, the file generation monitor 322 is further configured to monitor a number of files deleted during the running of the application process 112 on any of the sandbox machines 110(1), . . . , 110(N). The net result of this monitoring may be a file generation rate 352. For example, the process migration manager 130 may initialize the migration operation when the file generation rate 352 is below a threshold value.

The memory usage monitor 324 is configured to monitor an amount of memory accessed over the running of the application process 112 on any of the sandbox machines 110(1), . . . , 110(N). The net result of this monitoring may be a total memory usage or usage rate 354. For example, the process migration manager 130 may initialize the migration operation when the memory usage rate 352 is below a threshold value.

The sleep state monitor 326 determines whether the application process 112 is in a sleep state (i.e., very low or no process activity) during its run on any of the sandbox machines 110(1), . . . , 110(N). The net result of this monitoring may be an activity state 356 having a value of either "ACTIVE" or "SLEEP." For example, the process migration manager 130 may initialize the migration operation when the activity state 356 has the value "SLEEP."

Figure 4:
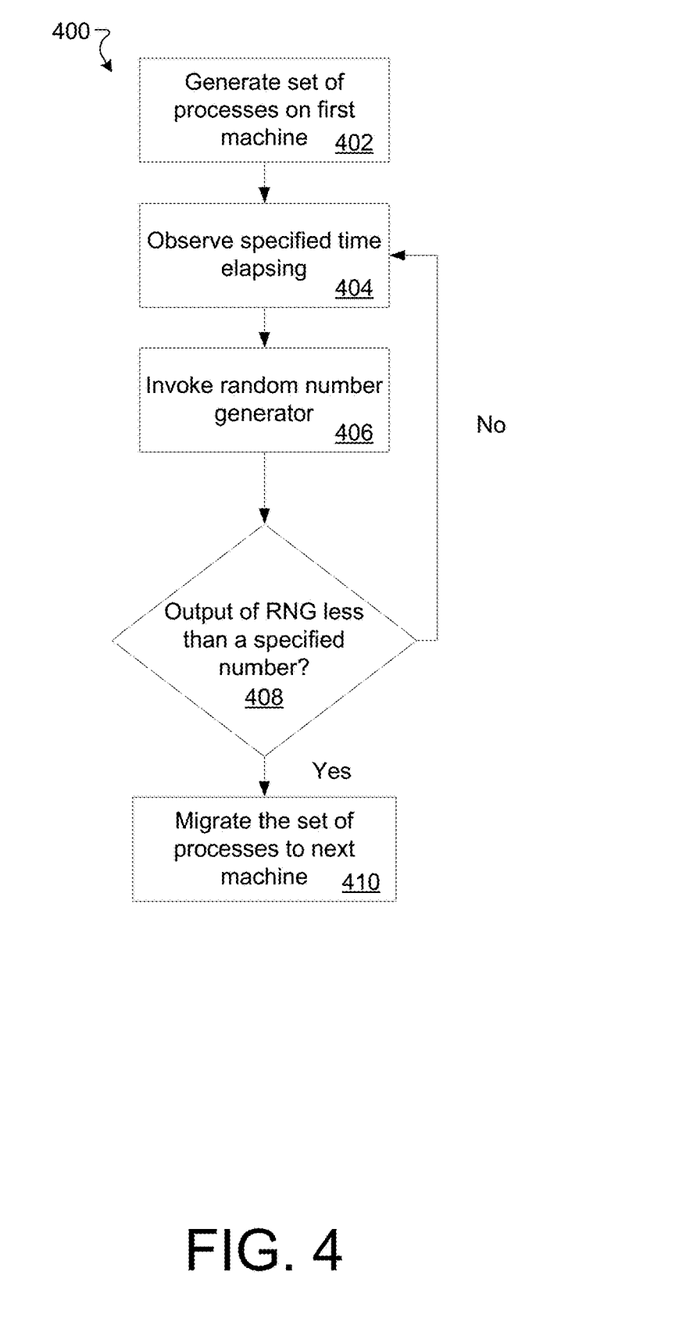
FIG. 4 is a flow chart that illustrates an example method of migration according to the improved techniques described herein.

FIG. 4 illustrates an example process 400 of performing a migration operation according to the improved techniques. The method 400 may be performed by software constructs described in connection with FIGS. 1 and 3, which reside in memory 126 of the computer 120 and are run by the set of processing units 124.

At 402, the computer 120 generates a set of application processes, i.e., application process 112 on a first sandbox machine as discussed above.

At 404, the computer 120, via process migration manager 130, monitors a specified time elapsing. For example, the time manager 310 records a time equal to the migration period 330.

At 406, the computer 120, via process migration manager 130, invokes the random number generator (RNG) 340 to generate a number between 0 and 1 at random with uniform probability distribution.

At 408, the computer 120, via process migration manager 130, verifies whether the number generated by the RNG 340 is greater than or less than a specified probability p. If the number is less than p, then the process migration manager 130 performs a migration operation 410 on the application process 112 to migrate the application process 112 to a second sandbox machine 110(N). If the number is greater than p, then the process 400 returns to 404.

Any of the metrics described in FIG. 3, as well as others not mentioned herein, may be used in a similar matter to perform the migration operation as described above.

Figure 5:
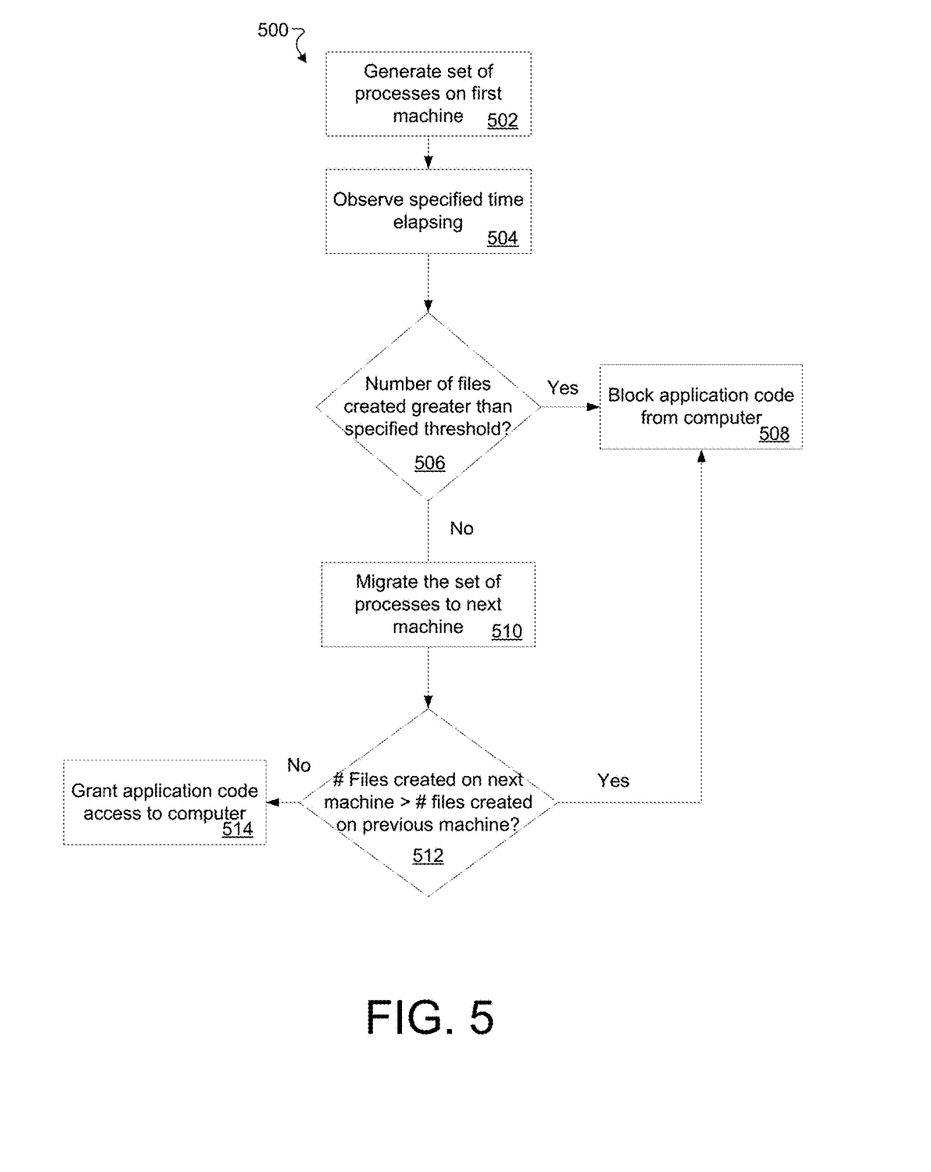
FIG. 5 is a graph that illustrates an example method of granting or denying application code access to the computer according to the improved techniques described herein.

FIG. 5 illustrates an example process 500 of protecting a computer from malware according to the improved techniques. The method 500 may be performed by software constructs described in connection with FIGS. 1 and 3, which reside in memory 126 of the computer 120 and are run by the set of processing units 124.

At 502, the computer 120 generates a set of application processes, i.e., application process 112 on a first sandbox machine as discussed above.

At 504, the computer 120, via process migration manager 130, monitors a specified time elapsing. For example, the time manager 310 records a time equal to the migration period 330.

At 506, the computer 120 verifies whether a number of files created on the first sandbox 110(1) is greater than some specified threshold. If so, then at 508 the computer 120 denies the application code access to the computer 120. If not, then at 510 the computer 120 performs the migration operation as described in FIGS. 3 and/or 4.

At 512, the computer 120 verifies whether a number of files created on the second sandbox 110(N) is greater than the number of files created on the first sandbox 110(1). If so, then at 508 the computer 120 denies the application code access to the computer 120. If not, then at 514 the computer 120 grants the application code access to the computer 120.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of protecting computers from malicious applications, the method comprising:
   receiving, by processing circuitry of a computer, application code that includes a set of instructions, the set of instructions, when executed by the computer on a first electronic machine, generating a set of processes on the first electronic machine that causes the first electronic machine to produce a first output;
   executing the set of instructions on the first electronic machine;
   performing a migration operation to migrate the set of processes on the first electronic machine to a second electronic machine distinct from the first electronic machine, the set of processes causing the second electronic machine to produce a second output;
   granting or denying the application code access to the computer based on the second output;
   monitoring an amount of time elapsed since the set of instructions were executed on the first machine; and
   the migration operation being performed after a specified time has elapsed with a specified probability.

2. The method as in claim 1, further comprising monitoring an activity level of the set of processes on the first electronic machine; and
   wherein the migration operation is performed in response to the activity level of the set of processes indicating that the set of processes is in a sleep mode.

3. The method as in claim 1, further comprising monitoring a first activity level of the set of processes on the first electronic machine and a second activity level of the set of processes on the second electronic machine; and
   wherein granting or denying the application code access to the computer includes denying the application code access to the computer in response to the second activity level exceeding the first activity level by a specified threshold amount.

4. The method as in claim 1, further comprising monitoring an amount of time elapsed since the set of instructions were executed on the first machine; and
   wherein the migration operation is performed in response to a specified time elapsed since the set of instructions were executed on the first machine.

5. The method as in claim 1, further comprising performing a comparison operation on the first output and the second output to produce a comparison result, and
   wherein the application code is granted or denied access to the computer based on the comparison result.

6. The method as in claim 5, wherein the first output is a first number of new files generated by the set of processes on a first disk accessible to the first machine and the second output is a second number of new files generated by the set of processes on a second disk accessible to the second machine, and
   wherein performing the comparison operation includes producing, as the comparison result, a difference between the second number and the first number.

7. The method as in claim 5, wherein the first output is a first rate of memory used by the set of processes on the first machine and the second output is a second rate of memory used by the set of processes on a second disk accessible to the second machine, and
   wherein performing the comparison operation includes producing, as the comparison result, a difference between the second rate and the first rate.

8. The method as in claim 1, wherein the first machine is a virtual machine, the virtual machine including other computer code stored on a storage device of another computer that includes a set of instructions, the set of instructions, when executed by the other computer, emulates the computer.

9. The method as in claim 1, wherein the second machine is a virtual machine, the virtual machine including other computer code stored on a storage device of another computer that includes a set of instructions, the set of instructions, when executed by the other computer, emulates the computer.

10. The method as in claim 1, wherein a first process of the set of processes corresponds to a first application configured to produce a respective first application output on each of the first machine and the second machine;
wherein a second process of the set of processes corresponds to a second application configured to produce a respective second application output on each of the first machine and the second machine; and
wherein performing the comparison operation includes producing, as the comparison result, a difference between the first application output and the second application output on the second machine and the first application output and the second application output on the first machine.

11. The method as in claim 1, wherein performing the migration operation includes copying the set of processes to the second machine while the set of processes continues to run on the first machine.

12. A method of protecting computers from malicious applications, comprising:
receiving, by processing circuitry of a computer, application code that includes a set of instructions, the set of instructions, when executed by the computer on a first electronic machine, generating a set of processes on the first electronic machine that causes the first electronic machine to produce a first output, the first output indicating a behavior of the set of processes while the set of processes runs on the first electronic machine;
executing the set of instructions on the first electronic machine;
performing a cloning operation to produce a copy of the set of processes in the first electronic machine to a second electronic machine;
activating the set of processes on the second electronic machine to cause the second electronic machine to produce a second output, the second output indicating a behavior of the set of processes while the set of processes runs on the first electronic machine;
terminating the set of processes on the first electronic machine; and
sampling the behaviors of the set of processes while the set of processes runs on the first electronic machine and the second electronic machine,
the performing the cloning operation including producing the copy with a specified probability after every fixed time period.

13. The method of claim 12, further comprising utilizing differences in a system in which the program runs, such differences including only sleeping processes, processes which are using relatively low memory or other temporal or inherent features of the program.

14. The method of claim 12, further comprising observing the set of processes during the performance of the cloning operation.

15. The method of claim 12, wherein a first process of the set of processes corresponds to a first application configured to produce a respective first application output on each of the first machine and the second machine;
wherein a second process of the set of processes corresponds to a second application configured to produce a respective second application output on each of the first machine and the second machine, and
wherein performing the cloning operation includes observing interactions between the first application and the second application.

16. The method of claim 15, wherein observing the interactions between the first application and the second application include detecting an attack requiring the first application and the second application.

17. A computer program product comprising a non-transitory storage medium, the computer program product including code that, when executed by processing circuitry of a computer, causes the processing circuitry to perform a method, the method comprising:
receiving application code that includes a set of instructions, the set of instructions, when executed by the computer on a first electronic machine, generating a set of processes on the first electronic machine that causes the first electronic machine to produce a first output;
executing the set of instructions on the first electronic machine;
performing a migration operation to migrate the set of processes on the first electronic machine to a second electronic machine distinct from the first electronic machine, the set of processes causing the second electronic machine to produce a second output; and
granting or denying the application code access to the computer based on the second output,
the second electronic machine being a virtual machine, the virtual machine including other computer code stored on a storage device of another computer that includes a set of instructions, the set of instructions, when executed by the other computer, emulates the computer.

* * * * *

UNITED STATES PATENT AND TRADEMARK OFFICE
CERTIFICATE OF CORRECTION

PATENT NO. : 10,043,010 B1  
APPLICATION NO. : 15/395011  
DATED : August 7, 2018  
INVENTOR(S) : Striem-Amit Page 1 of 1

It is certified that error appears in the above-identified patent and that said Letters Patent is hereby corrected as shown below:

On the Title Page

Item (56), under "U.S. PATENT DOCUMENTS", Entry 4, Line 1, delete "Krasin, IV" and insert -- Krasin --, therefor.

Item (57), under "ABSTRACT", Line 12, delete "based the second" and insert -- based on the second --, therefor.

Signed and Sealed this  
Eleventh Day of December, 2018

Andrei Iancu  
*Director of the United States Patent and Trademark Office*